E. A. GROSS.
PLANTING IMPLEMENT.
APPLICATION FILED MAY 28, 1912.
1,106,203.
Patented Aug. 4, 1914.
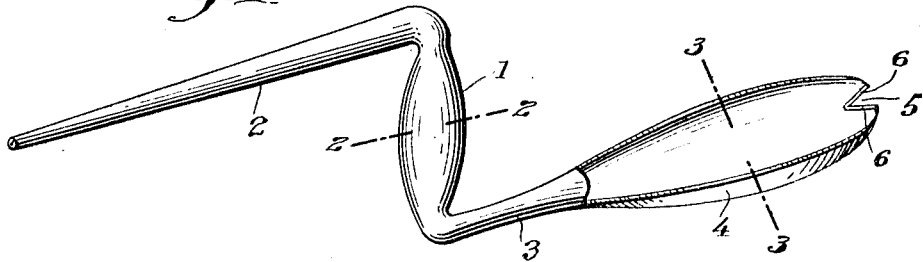
WITNESSES
INVENTOR
Elam A. Gross,
BY
Victor J. Evans
ATTORNEY

UNITED STATES PATENT OFFICE.

ELAM A. GROSS, OF CAMDEN, NEW JERSEY.

PLANTING IMPLEMENT.

1,106,203.  Specification of Letters Patent.  Patented Aug. 4, 1914.

Application filed May 28, 1912. Serial No. 700,296.

*To all whom it may concern:*

Be it known that I, ELAM A. GROSS, a citizen of the United States, residing at Camden, in the county of Camden and State of New Jersey, have invented new and useful Improvements in Planting Implements, of which the following is a specification.

This invention relates to planting tools, sometimes known as "dibbles", and it has for its object to produce a simple and efficient tool comprising a rod whereby an opening may be made to receive a charge of seed or a plant set, a scoop or shovel whereby the earth may be manipulated to cover the seed or set, said scoop being provided with a notch having cutting edges for exterminating weeds and other purposes; said tool comprising also a handle connecting the implements which may be thereby conveniently manipulated.

With these and other ends in view which will readily appear as the nature of the invention is better understood, the same consists in the improved construction and novel arrangement and combination of parts which will be hereinafter fully described and particularly pointed out in the claim.

In the accompanying drawing has been illustrated a simple and preferred form of the invention, it being, however, understood that no limitation is necessarily made to the precise structural details therein exhibited, but that changes, alterations and modifications within the scope of the claim may be resorted to when desired.

In the drawing,—Figure 1 is a perspective view showing a simple and preferred form of the improved tool. Fig. 2 is a sectional detail view taken through the handle on the line 2—2 in Fig. 1. Fig. 3 is a sectional detail view taken through the scoop on the line 3—3 in Fig. 1.

Corresponding parts in the several figures are denoted by like characters of reference.

In the embodiment of the invention illustrated in the drawing, the device is preferably formed of sheet metal which is stamped, pressed or otherwise formed into the desired shape, and it comprises a hollow handle 1 from one end of which extends a pointed rod or dibble 2, while from the other end of the handle extends a shank 3 terminating in a scoop or blade 4 which is of oval or elliptical shape arcuate longitudinally, and also of arcuate cross section, as best seen in Fig. 3, said scoop or blade being provided at the outer extremity thereof with a V-shaped notch 5 having sharp cutting edges 6. The rod or dibble 2 and the blade carrying shank 3 extend in dimetrically opposite directions with reference to the longitudinal axis of the handle member 1, with respect to which the said dibble 2 and blade carrying shank 3 are positioned approximately at right angles, as will be readily understood by reference to Fig. 1.

As will be seen from the foregoing description, taken in connection with the drawing hereto annexed, the improved tool or implement may be readily manipulated by means of a handle portion to make a hole in the ground for the reception of seed or a plant set, as the case may be, such hole being enlarged, if necessary, by the use of the scoop or blade. The latter, after the depositing or placing of the seed or plant set, may be utilized to move the dirt in the position to cover and protect the same. The V-shaped notch at the extremity of the scoop or blade being provided with cutting edges may be effectively utilized for crushing and pulverizing the soil when needed, and it will also be found extremely useful in eradicating weeds by so engaging the roots thereof as to permit the entire plant to be lifted from the ground and destroyed.

Having thus described the invention, what is claimed as new, is:—

A planting implement comprising a hollow tubular handle portion, a hollow tubular dibble and a hollow tubular shank, said dibble and shank extending in diametrically opposite directions from the ends of the handle portion, substantially at right angles to the latter and the tubular shank having a terminal scoop-like blade with a V-shaped notch at its outer end, said implement being formed of sheet metal.

In testimony whereof I affix my signature in presence of two witnesses.

ELAM A. GROSS.

Witnesses:
NORMAN J. SMITH,
JOHN A. MANGLE.

---

Copies of this patent may be obtained for five cents each, by addressing the "Commissioner of Patents, Washington, D. C."